Aug. 4, 1959   W. H. DE VAAN   2,898,070
REAR VIEW MIRROR ATTACHING BRACKET
Filed Aug. 29, 1956
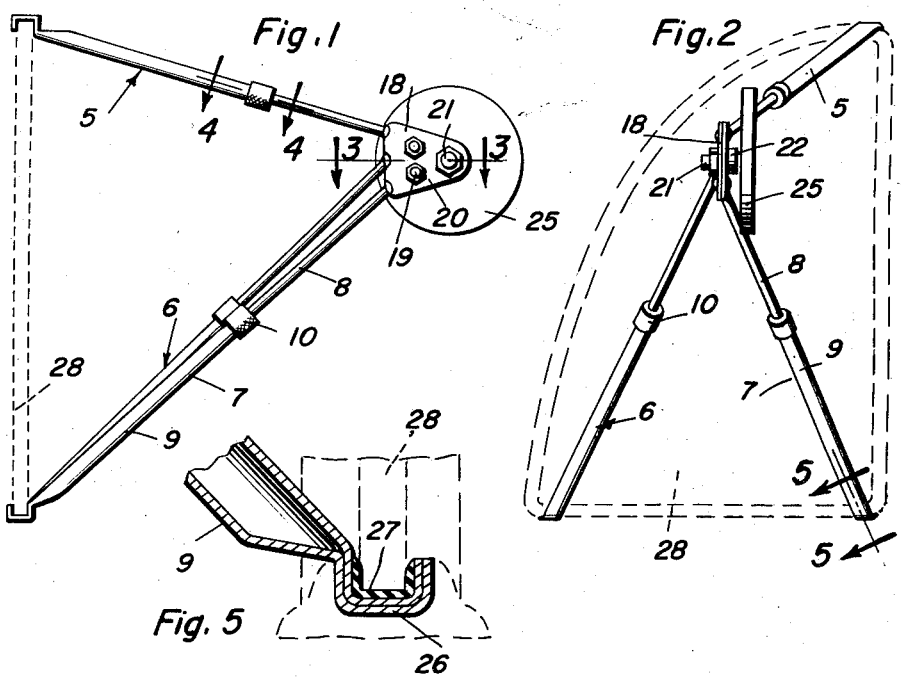
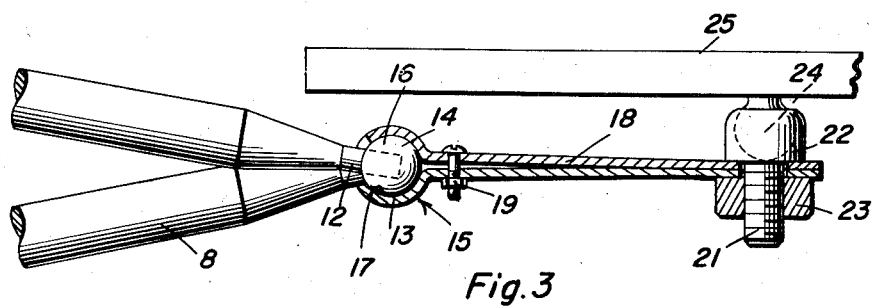
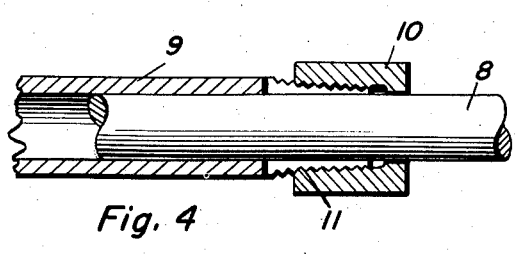
Walter H. DeVaan
INVENTOR.

United States Patent Office 2,898,070
Patented Aug. 4, 1959

2,898,070

REAR VIEW MIRROR ATTACHING BRACKET

Walter H. De Vaan, Yankton, S. Dak.

Application August 29, 1956, Serial No. 606,853

1 Claim. (Cl. 248—226)

The present invention relates to rear view mirrors for use on ventilator type windows of automobiles, trucks or other motor vehicles and more particularly to an attaching bracket for the mirror.

An important object of the invention is to provide an attaching bracket for a rear view mirror to support the latter in an outwardly projecting position at the side of an automobile when pulling a trailer or when a truck is hauling a wide load to enable the driver to observe traffic at his rear.

Another object is to provide a plurality of mirror supporting arms arranged in diverging relation to each other and constructed with channel shaped clamps to grip the top and bottom edges of a swingable ventilator type window to support a mirror in an outwardly projecting position thereon.

A further object is to provide a device of this character of simple and practical construction and which is strong and durable, relatively inexpensive to manufacture and otherwise well adapted for the purpose for which the same is intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a rear elevational view;

Figure 2 is a side elevational view;

Figures 3 and 4 are enlarged sectional views taken respectively on the lines 3—3 and 4—4 of Figure 1; and Figure 5 is an enlarged sectional view of one of the channel-shaped clamping members taken on a line 5—5 of Figure 2.

Referring now to the drawing in detail, wherein for the purpose of illustration I have disclosed a preferred embodiment of my invention, the numerals 5, 6 and 7 designate a plurality of telescopically extensible arms, each of which includes an inner rod 8 having one end slidable in a tubular metal rod 9 and secured in extensibly adjusted position by a nut 10 threaded on tapering, longitudinally split extensions 11 on the tubular rod to contract the latter into friction gripping engagement with the rod 8.

The other end of rod 8 is formed with a reduced threaded extension 12 which is threaded into a recess 13 in a ball 14 to rigidly secure the ball thereto. Each ball 14 is clamped in a socket 15 formed by a pair of opposing concaved recesses 16 and 17 at an edge portion of a flat connector composed of a pair of substantially triangular shaped plates 18 and the plates are secured in confronting relation to each other by bolts and nuts 19 to tighten the balls in the sockets.

The corner 20 of the plates 18 remote from the sockets 15 is supported on a threaded stud 21 and the plates are clamped against the back of a diametrically enlarged socket 22 by a nut 23 threaded on the stud. A ball 24 at the back of a rear view mirror 25 is swivelly engaged in the socket 22 and is frictionally retained in adjusted position on the plates 18.

The outer end of each tubular rod 9 is flattened and shaped to form a channel-shaped clamping member 26 having a rubber pad 27 cemented therein.

The three arms 5, 6 and 7 are arranged in diverging relation to each other and with arm 5 inclined upwardly and arms 6 and 7 inclined downwardly to respectively engage the upper and lower edges of a swingable ventilator type window 28 of an automobile or other motor vehicle and the arms are extensibly adjusted to support the mirror 25 outwardly with respect to the window.

The channel members 26 firmly grip the edges of the window to easily and quickly attach the arms thereto without the use of screws or other fasteners which tend to mar the window frame.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A mirror attaching bracket comprising a plurality of arms arranged in diverging relation to each other, channel-shaped clamping members at the diverging ends of the arms disposed in triangular arrangement for gripping edges of a supporting structure, ball members on the converging ends of the arms, a pair of triangular plates disposed side by side and having corresponding straight edges provided conjointly with sockets spaced along the same in alignment and receiving said ball members, means connecting the plates together with the sockets clampingly engaging the ball members, a mirror, and means including a ball and socket pivotally connecting the mirror to said plates at one corner of the plates remote from said straight edges.

References Cited in the file of this patent

UNITED STATES PATENTS

| | | |
|---|---|---|
| 1,455,441 | Hodny | May 15, 1923 |
| 1,527,544 | Elwell | Feb. 25, 1925 |
| 2,052,770 | Hofer | Sept. 1, 1936 |
| 2,229,474 | Redmer | Jan. 21, 1941 |
| 2,552,074 | Thompson | May 8, 1951 |
| 2,558,911 | Penn | July 3, 1951 |

FOREIGN PATENTS

| | | |
|---|---|---|
| 584,173 | Germany | Sept. 15, 1933 |